United States Patent [19]

Hartman

[11] Patent Number: 4,579,477

[45] Date of Patent: Apr. 1, 1986

[54] PIN-KEY ASSEMBLY

[76] Inventor: Thomas A. Hartman, 700 Capac Ct., St. Louis, Mo. 63125

[21] Appl. No.: 496,003

[22] Filed: May 19, 1983

[51] Int. Cl.⁴ ............................................. F16B 19/02
[52] U.S. Cl. ..................................... 403/324; 403/358; 403/379; 403/409.1; 411/354; 411/357
[58] Field of Search ............... 411/354, 355, 356, 357, 411/426; 403/358, 409, 324, 378, 379, 374

[56] References Cited

U.S. PATENT DOCUMENTS

| 420,010 | 1/1890 | Hain . | |
|---|---|---|---|
| 582,750 | 5/1897 | Leaycraft . | |
| 867,468 | 10/1907 | Bechtolsheim | 403/358 |
| 939,933 | 11/1909 | Trautner | 411/354 |
| 1,041,448 | 10/1912 | Dougherty . | |
| 1,050,385 | 1/1913 | Palmgren | 411/354 X |
| 1,412,235 | 4/1922 | Felix . | |
| 1,546,052 | 7/1925 | Kempf | 411/355 |
| 1,886,177 | 11/1932 | Gairing | 411/357 X |
| 2,377,046 | 2/1944 | Siegerist . | |
| 2,480,429 | 8/1949 | Wade | 411/355 |
| 2,501,505 | 3/1955 | Garrison . | |
| 3,391,953 | 7/1968 | Jordan . | |
| 3,428,343 | 2/1969 | Downie | 403/358 |
| 4,411,550 | 10/1983 | Schutt et al. | 403/358 |

FOREIGN PATENT DOCUMENTS

| 385806 | 12/1923 | Fed. Rep. of Germany | 403/378 |
| 357967 | 11/1905 | France | 403/358 |
| 912619 | 4/1946 | France . | |
| 421124 | 12/1934 | United Kingdom | 411/354 |
| 361321 | 1/1973 | U.S.S.R. | 411/355 |
| 547565 | 5/1977 | U.S.S.R. | 403/324 |

Primary Examiner—Thomas J. Holko
Attorney, Agent, or Firm—Rogers, Howell, Moore & Haferkamp

[57] ABSTRACT

A tapered pin-key for securing a part and a shaft where the part has a cylindrical bore for receiving the shaft and a keyway tangentially intersecting the bore, and the shaft has a tangential groove shallower than the depth of the intersection of the keyway and the bore. The pin-key comprises two cylindrical surfaces converging at a small angle. The radius of the two cylindrical surfaces, the keyway, and the groove in the shaft, are all equal. The pin-key is placed in the keyway with one face engaging the surface of the keyway and the second face engaging the surface of the groove in the shaft, thereby securing the part and the shaft against relative rotational or axial movement.

15 Claims, 11 Drawing Figures

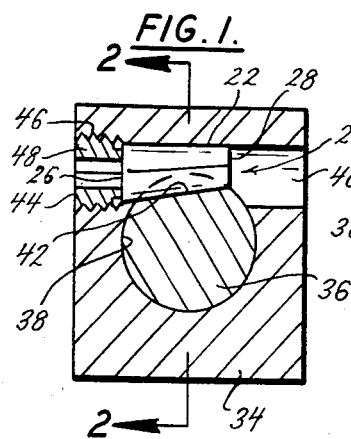
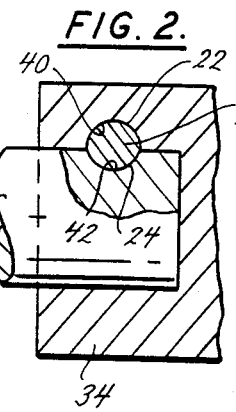
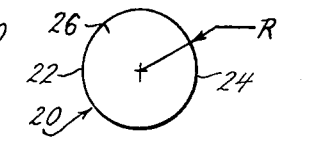
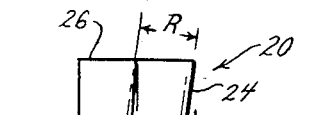
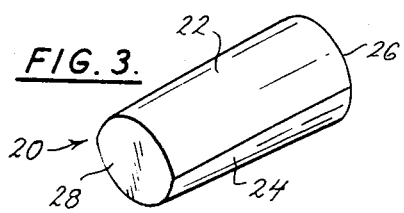
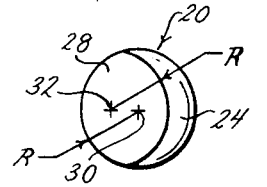
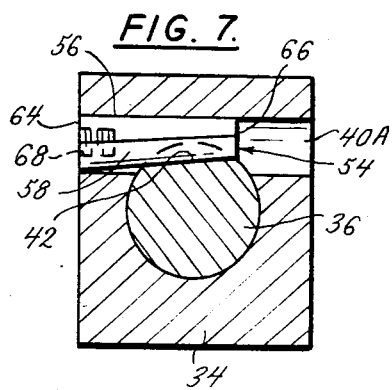
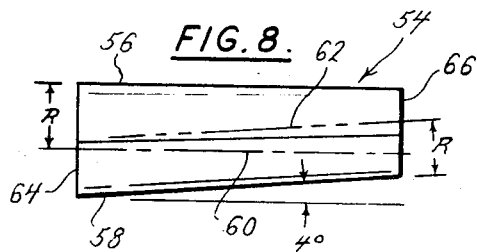
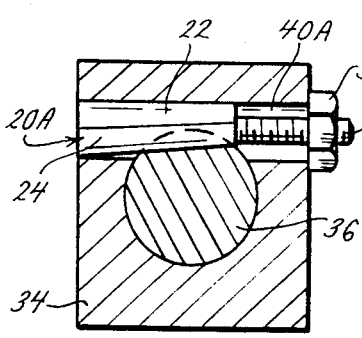
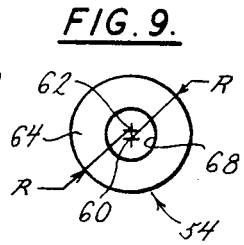

PIN-KEY ASSEMBLY

BACKGROUND AND SUMMARY OF THE INVENTION

This invention relates generally to mechanical fasteners and in particular to a tapered pin-key for engaging a part to a shaft.

Pin-keys have long been known and used to engage a part to a shaft or vice versa. Their major use is to prevent relative rotation between a shaft and the rotating members mounted to it. Relative axial motion is also prevented. The part is provided with a bore for receiving the shaft and a keyway intersecting the bore and oriented perpendicular to the axis of the bore. The keyway can either intersect the center of the bore, in which case the shaft would be provided with an aligned diametrical hole, or the keyway can tangentially intersect the bore, in which case the shaft would be provided with an aligned tangential groove in its surface. The pin-key is inserted into the keyway and into the aligned hole or groove in the shaft to engage the shaft and the part.

One of the problems with the prior art pin-key and keyway systems was that exact alignment was required between the keyway and the hole or groove in the shaft. If the keyway and hole or groove in the shaft were made simultaneously by drilling the keyway with the shaft in place, it was difficult to maintain the interchangeability and replaceability of the shafts and parts because of the tendency of a drill to drift into softer material. Since the shaft and part were rarely of the same material, the drill would tend to drift from a vertical line and thus each member and shaft would be slightly different. This problem was especially pronounced in the tangential type keyway. This problem could only be alleviated with special equipment and time consuming and expensive shop procedures. If the part and shaft were to be separately manufactured, precise machining was required to insure that the holes and grooves were properly located. This made the shafts and parts very expensive.

While cylindrical pin-keys and keyways were in general use, the majority of prior art pin-keys and keyways were tapered. The tapered pin-keys and keyways were frustoconical in shape and were preferable over the cylindrical configuration because they achieve a tighter engagement between the part and shaft. The cylindrical pin-key had to be made smaller than the keyway to allow the pin-key to be inserted and removed from the keyway. Thus, there was some play between the shaft and part. In contrast, the tapered pin-key, by virtue of its narrowing configuration, could be inserted into the tapering keyway until it was firmly engaged therein on all sides, thereby eliminating the play between the shaft and part. However, while achieving a tighter engagement than the cylindrical configuration, the tapered pin-keys and keyways had a disadvantage in that they were more expensive to manufacture because their manufacture was difficult, time consuming, and required special equipment. In addition, precise alignment was needed between the keyway and the hole in the shaft.

The pin-key of this invention has a tapered configuration, having two cylindrical surfaces converging at a small angle. The pin-key is designed for use in a keyway tangentially intersecting the bore for receiving the shaft. The tangential keyway is preferable to the keyway extending through the center of the bore, because far less shaft material is removed in making a groove aligned with the tangential keyway than in making a hole aligned with a keyway intersecting the center of the bore. Thus, the shaft is left stronger, with more cross-sectional area to bear torsional or other loads. Furthermore, the surface groove has far less stress concentrating effect than the hole through the shaft.

The tapered configuration of the pin-key of this invention allows the pin-key to achieve the firm engagement of the prior art tapered pins, but because the pin-key is formed from cylindrical surfaces, the pin-key, keyway and groove all have cylindrical rather than tapered surfaces, and are thus easier and less expensive to machine. Furthermore, the precise alignment of the keyway and the groove required for prior art pins is no longer necessary. Variation in the depth of the groove in the shaft is permissible.

BRIEF DESCRIPTION OF THE DRAWINGS

FIG. 1 is a side view of the tapered pin-key of this invention as it would be received in a keyway in a part to secure the part to a shaft;

FIG. 2 is a cross-sectional view of the pin-key taken along line 2—2 in FIG. 1 showing the engagement between the part and the pin-key, and the pin-key and the shaft;

FIG. 3 is an orthogonal view of the tapered pin-key;

FIG. 4 is a top view of the tapered pin-key;

FIG. 5 is a side view of the tapered pin-key;

FIG. 6 is a bottom view of the tapered pin-key;

FIG. 7 is a side view of a self-locking tapered pin-key, also of this invention, as it would be received in a keyway into a part to secure the part to the shaft;

FIG. 8 is a side view of the self-locking tapered pin-key;

FIG. 9 is a top view of the self-locking tapered pin-key.

FIG. 10 is a bottom view of the self-locking tapered pin-key;

FIG. 11 is a side view of a tapered pin-key provided with a threaded stud for securing the pin-key in the keyway.

DESCRIPTION OF THE PREFERRED EMBODIMENT

The tapered pin-key 20 of the first embodiment of this invention is shown in FIG. 3 as comprising two converging cylindrical faces 22 and 24. Faces 22 and 24 have equal radii. Top 26, as shown in FIG. 4, is circular and bottom 28, as shown in FIG. 6, is generally elliptical. As shown in FIG. 5, top 26 and bottom 28 are perpendicular to face 22. The axes 30 and 32 of faces 22 and 24, respectively, intersect and thus faces 22 and 24 converge toward bottom 28 of pin-key 20. It is preferable that the axes intersect at, and thus the faces converge at, an angle of about between 1° and 11°. In the first embodiment, the axes 30 and 32 intersect at, and faces 22 and 24 converge at, an angle of about 8.5°.

Pin-key 20 is particularly useful for securing a part to a shaft, as shown in FIG. 1, where part 34 and shaft 36 are secured with pin-key 20. Part 34 is provided with a bore 38 for receiving shaft 36 and a cylindrical keyway 40 perpendicular to the axis of bore 38 and tangentially intersecting bore 38 to depth equal to about the radius of the keyway. The radius of keyway 40 is equal to the radii of faces 22 and 24, and it is preferable that these dimensions are between 40 to 50 percent of the radius of shaft 36. Shaft 36 is provided with a tangential cylindrical groove 42 that is of the same radius as faces 22 and 24 and that is shallower than the depth of the intersection of keyway 40 and bore 38 and is preferably about two-thirds of the radius deep. Thus, keyway 40 intersects bore 38 to a greater depth than groove 42 penetrates shaft 36 so that the cylindrical surface of groove 42 and the surrounding portion of shaft 36 protrudes into keyway 40. The protrusion of shaft 36 into keyway 40 is clearly shown in FIG. 1. Groove 42 is aligned with keyway 40 so that when shaft 36 is properly seated in bore 38, pin-key 20 can be inserted into keyway 40 and into engagement with groove 42. As shown in FIGS. 1 and 2, face 22 engages the cylindrical surface of keyway 40 and face 24 engages the cylindrical surface of groove 42 with the angle formed between the axes of keyway 40 and groove 42 being the same as the angle of the intersection of axes 30 and 32 and the convergence of faces 22 and 24.

Where the angle of convergence of the sides of the pin-key is between about 1° and 5°, the pin-key is relatively self-locking in the keyway. Where the angle of convergence is greater than about 5°, as in pin-key 20, the pin-key is relatively easily removeable. Thus, to retain pin-key 20 in keyway 40, top 44 of keyway 40 is provided with threads 46 for receiving a retaining plug 48.

An alternative method of securing a pin-key is shown in FIG. 11. There, part 34 and shaft 36 are as described above, with corresponding parts identified with the same numerals. However, keyway 40A in FIG. 11 does not have threads 46 about its top as does keyway 40. Pin-key 20A, shown in FIG. 11, has a threaded stud 50 extending from its bottom, but is otherwise identical to pin-key 20 described above, and corresponding parts are identified with the same numerals. Pin-key 20A operates exactly like pin-key 20 to secure part 34 and shaft 36. When properly placed in keyway 40A, stud 50 extends out of keyway 40A. A nut 52 can be threaded onto stud 50 to secure pin-key 20A.

The tapered pin-key 54 of the second embodiment of this invention is shown in FIG. 7 in keyway 40A securing part 34 and shaft 36. There, part 34 and shaft 36 are as described above, with corresponding parts identified with the same reference numerals. However, keyway 40A does not have threads 46 about its top as does keyway 40.

Pin-key 54 comprises two converging cylindrical faces 56 and 58, having equal radii. The axes 60 and 62 of faces 56 and 58, respectively, intersect at, and thus faces 56 and 58 converge at, an angle of about 4°. Top 64, as shown in FIG. 9, is circular and bottom 66, as shown in FIG. 10, is generally elliptical. Top 64 and bottom 66 are perpendicular to face 56.

When shaft 36 is properly seated in bore 38 in part 34 so that groove 42 is aligned with keyway 40A, pin-key 54 can be inserted into keyway 40A. As shown in FIG. 7, face 56 engages the cylindrical surface of keyway 40A and face 58 engages the cylindrical surface of groove 42. Faces 56 and 58 converge at an angle of about 4° which is within the range of about 1° to 5° previously described for self-locking pin-keys. Thus, it is usually not necessary to provide means to secure pin-key 54 in the keyway. In fact, because pin-key 54 is self-locking in keyway 40A, the top 64 is provided with a threaded hole 68. Hole 68 can be used to help remove pin-key 54 from keyway 40A by inserting a threaded pin into hole 68 to provide a hold on pin-key 54 to remove it.

OPERATION

The pin-key of this invention, as described above, is particularly suited to mounting a part to a shaft. The part must have a bore for receiving the shaft and a cylindrical keyway perpendicular to the bore's axis and tangentially intersecting the bore. The radius of the keyway is preferably equal to 40 to 50 percent of the shaft's radius. The shaft has a tangential groove of the same radius as the keyway but shallower than the depth of the intersection of the keyway and bore and preferably about approximately two-thirds of the radius deep. Thus, the keyway intersects the bore to a greater depth than the groove penetrates the shaft so that the cylindrical surface of the groove and the surrounding portion of the shaft protrudes into the keyway. The groove is positioned so that when the shaft is properly seated in the bore, the groove is aligned with the keyway.

Where the readily removeable type of pin-key of the first embodiment, 20, is used, the radius of the faces 22 and 24 are equal to the radius of keyway 40 and to the radius of groove 42 in shaft 36. With shaft 36 properly seated in bore 38 so that groove 42 is aligned with keyway 40, pin-key 20 is inserted into keyway 40 until face 22 firmly engages the surface of keyway 40 and face 24 firmly engages the surface of groove 42. Because of the tapered shape of pin-key 20, pin-key 20 travels into keyway 40 until it firmly engages part 34 and shaft 36. Because of the cylinder-to-cylinder contact between pin-key 20 and keyway 40 on one side and pin-key 20 and groove 42 on the other, the engagement is very secure.

Since the relatively higher angle of convergence of faces 22 and 24 permits easy removal of pin-key 20, a retainer cap 48 can be threaded into the top 44 of keyway 40 and into abuttment with top 26 of pin-key 20. With retainer cap 48 in place, pin-key 20 is secured in keyway 40 against accidental dislodgement. Alternatively, modified pin-key 20A can be used exactly as described above, however, pin-key 20A has a threaded stud 50 which, when pin-key 20A is properly fitted in keyway 40A protrudes from the end of keyway 40A. Nut 52 can then be threaded on stud 50 to secure pin-key 20A in keyway 40A.

Where the self-locking type pin-key of the second embodiment 54 is used, the radius of faces 56 and 58 are equal to the radius of keyway 40 and to the radius of groove 42 in shaft 36. With shaft 36 properly seated in bore 38 so that groove 42 is aligned with keyway 40A, pin-key 54 is inserted into keyway 40A until face 56 firmly engages the surfaces of keyway 40A and face 58 firmly engages the surface of groove 42. Again, because of the tapered shape of the pin-key and the cylinder-to-cylinder contact between pin-key 54 and keyway 40 on one side and pin-key 54 and groove 42 on the other side, the engagement between part 34 and shaft 36 is very secure.

Because of the relatively lower angle of convergence of faces 56 and 58, pin-key 54 is not easily dislodged from keyway 40A. Thus, it is often not necessary to provide a retaining means such as retainer cap 48 or threaded stud 50 and nut 52 in conjunction with the first embodiment of this invention. The engagement of pin-key 54 in keyway 40A is sometimes so secure that a threaded pin or tool is inserted into hole 68 to provide a grip on pin-key 54 to effect its removal.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

I claim:

1. A pin-key assembly for mounting a shaft to a part to lock the shaft against both axial and torsional movement relative to the part, said assembly comprising:
   a shaft;
   a part bored to fit the shaft and mounted thereon;
   a cylindrical keyway in the part tangentially intersecting the bore;
   a tangential cylindrical groove in the shaft shallower than the intersection of the keyway and bore;
   a tangential tapered pin-key having a first cylindrical face and a second cylindrical face that converge toward the bottom of the pin-key, the pin-key mounted in the keyway with the first cylindrical face engaging the surface of the cylindrical keyway and the second cylindrical face engaging the surface of the cylindrical groove in the shaft, the radius of the first cylindrical face of the pin-key being equal to the radius of the cylindrical keyway, and the radius of the second cylindrical face of the pin-key being equal to the radius of the cylindrical groove.

2. The assembly of claim 1 wherein the first and second faces converge at an angle of about between 1° and 11°.

3. The assembly of claim 2 wherein the first and second faces converge at an angle of about 8.5°.

4. The assembly of claim 2 wherein the first and second faces converge at an angle of about 4°.

5. The assembly of claim 1 further comprising an externally threaded stud protruding from the bottom of the pin-key.

6. The assembly of claim 1 further comprising means defining a threaded hole in the top of the pin-key.

7. The combination of claim 1 wherein the cylindrical faces of the pin-key intersect along opposite sides of the pin-key.

8. A pin-key assembly for mounting a shaft to a part to lock the shaft against both axial and torsional movement relative to the part, said assembly comprising:
   a shaft;
   a part bored to fit the shaft and mounted thereon;
   a cylindrical keyway in the part tangentially intersecting the bore;
   a tangential cylindrical groove in the shaft shallower than the intersection of the keyway and bore;
   the radius of the cylindrical keyway being equal to the radius of the cylindrical groove;
   a tangential tapered pin-key having a first cylindrical face and a second cylindrical face that converge toward the bottom of the pin-key, the first and second cylindrical faces having equal radii, and the cylindrical faces having radii equal to the radii of the cylindrical keyway and the cylindrical groove;
   the pin-key mounted in the keyway with the first cylindrical face engaging the surface of the cylindrical keyway and the second cylindrical face engaging the surface of the cylindrical groove in the shaft, the radius of the first cylindrical face of the pin-key being equal to the radius of the cylindrical keyway, and the radius of the second cylindrical face of the pin-key being equal to the radius of the cylindrical groove.

9. The assembly of claim 8 wherein the first and second faces converge at an angle of about between 1° and 11°.

10. The assembly of claim 9 wherein the first and second faces converge at an angle of about 8.5°.

11. The assembly of claim 9 wherein the first and second faces converge at an angle of about 4°.

12. The assembly of claim 8 further comprising an externally threaded stud protruding from the bottom of the pin-key.

13. The assembly of claim 8 further comprising means defining a threaded hole in the top of the pin-key.

14. The assembly of claim 8 wherein the top and bottom are perpendicular to the first face.

15. The structure of claim 8 wherein the cylindrical faces of the pin-key intersect along opposite sides of the pin-key.

* * * * *